United States Patent
Chandrasekharan

(10) Patent No.: US 10,277,557 B1
(45) Date of Patent: Apr. 30, 2019

(54) APPARATUS, SYSTEM, AND METHOD FOR COMPRESSING PORT LIST DEFINITIONS FOR SPARSE PORT INDICES

(71) Applicant: Juniper Networks, Inc., Sunnyvale, CA (US)

(72) Inventor: Bijoymon M. Chandrasekharan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/640,491

(22) Filed: Jul. 1, 2017

(51) Int. Cl.
*H04L 29/08* (2006.01)
*H04L 29/12* (2006.01)
*H04L 12/741* (2013.01)

(52) U.S. Cl.
CPC .......... *H04L 61/6063* (2013.01); *H04L 45/74* (2013.01); *H04L 69/326* (2013.01)

(58) Field of Classification Search
CPC .... H04L 61/6063; H04L 45/74; H04L 69/326
USPC .......................................................... 370/392
See application file for complete search history.

(56) References Cited

U.S. PATENT DOCUMENTS

| | | | | |
|---|---|---|---|---|
| 6,614,781 B1 * | 9/2003 | Elliott | ................. | H04L 12/6418 370/352 |
| 8,850,035 B1 * | 9/2014 | Vemulapalli | ............ | H04L 67/10 455/404.2 |
| 2003/0210691 A1 * | 11/2003 | Chen | ................. | H04L 29/12377 370/389 |
| 2004/0264374 A1 * | 12/2004 | Yu | ............................ | H04L 45/00 370/230 |
| 2005/0152538 A1 * | 7/2005 | Stedron | ..................... | G09C 1/02 380/28 |
| 2014/0294006 A1 * | 10/2014 | Rajsic | ................. | H04L 61/2503 370/392 |
| 2015/0341958 A1 * | 11/2015 | Guo | ..................... | H04W 72/042 370/329 |
| 2017/0134216 A1 * | 5/2017 | Bitar | ................... | H04W 64/003 |

OTHER PUBLICATIONS

Wikipedia—List of TCP and UDP Port Numbers, https://en.wikipedia.org/wiki/List_of_TCP_and_UDP_port_numbers.

* cited by examiner

*Primary Examiner* — Christopher R Crompton
(74) *Attorney, Agent, or Firm* — FisherBroyles, LLP

(57) ABSTRACT

The disclosed apparatus may include (1) a storage device that stores a port list definition as a bitmap that identifies port numbers of network socket ports and (2) a physical processor that (A) formats the port list definition such that the bitmap includes (I) a first set of indices that each represent an offset of one or more network socket ports and (II) a second set of indices that are each paired to an index within the first set of indices and each correspond to port numbers of the network socket ports and whose values are calculated based on the offset of the paired index and (B) forwards at least one packet from the network device to a remote device using at least one of the network socket ports whose port numbers are identified in the bitmap. Various other apparatuses, systems, and methods are also disclosed.

16 Claims, 8 Drawing Sheets

APPARATUS, SYSTEM, AND METHOD FOR COMPRESSING PORT LIST DEFINITIONS FOR SPARSE PORT INDICES

BACKGROUND

Port lists are often used to identify a set of Internet socket ports that are available to network devices. These socket ports may enable network devices to establish connectivity with one another via certain protocols of the transport layer. Unfortunately, in certain scaled interface configurations, traditional port lists may grow long enough that the values of certain objects exceed a usable size threshold. In other words, such port list objects may have values that are inaccessible and/or unfetchable by tools with certain size limitations.

As an example, a network device may add and/or incorporate more than 16,000 logical interfaces to a Management Information Base (MIB) object. In this example, the router may also add and/or incorporate an aggregate interface that bundles 16 physical ports to the MIB object. To represent the port numbers of all those ports, the router may need to use more than 16,000 sparse port indices, which exceeds 2000 bytes. As a result, some traditional Simple Network Management Protocol (SNMP) and/or Network Management System (NMS) tools may be unable to access and/or fetch the values of those objects from the MIB.

The instant disclosure, therefore, identifies and addresses a need for improved and/or additional apparatuses, systems, and methods for compressing port list definitions for sparse port indices.

SUMMARY

As will be described in greater detail below, the instant disclosure generally relates to apparatuses, systems, and methods for compressing port list definitions for sparse port indices. In one example, an apparatus for accomplishing such a task may include (1) a storage device that stores a port list definition as a bitmap that identifies port numbers of network socket ports used by a network device to transport traffic across a network and (2) a physical processor that is communicatively coupled to the storage device, wherein the physical processor (A) formats the port list definition such that the bitmap includes (I) a first set of indices that each represent an offset of one or more network socket ports that facilitate transporting traffic across the network and (II) a second set of indices that are each paired to an index within the first set of indices and each correspond to port numbers of the network socket ports that facilitate transporting traffic across the network and whose values are calculated based at least in part on the offset of the paired index within the first set of indices and (B) forwards at least one packet from the network device to a remote device using at least one of the network socket ports whose port numbers are identified in the bitmap.

Similarly, a system incorporating the above-described apparatus may include various modules stored in memory and at least one physical processor configured to execute the control module and the forwarding module. For example, such a system may include (1) a control module that (A) maintains a port list definition as a bitmap that identifies port numbers of network socket ports used by a network device to transport traffic across a network and (B) formats the port list definition such that the bitmap includes (I) a first set of indices that each represent an offset of one or more network socket ports that facilitate transporting traffic across the network and (II) a second set of indices that are each paired to an index within the first set of indices and each correspond to port numbers of the network socket ports that facilitate transporting traffic across the network and whose values are calculated based at least in part on the offset of the paired index within the first set of indices and (2) a forwarding module that forwards at least one packet from the network device to a remote device using at least one of the network socket ports whose port numbers are identified in the bitmap.

A corresponding method may include (1) maintaining a port list definition as a bitmap that identifies port numbers of network socket ports used by a network device to transport traffic across a network, (2) formatting the port list definition such that the bitmap includes (A) a first set of indices that each represent an offset of one or more network socket ports that facilitate transporting traffic across the network and (B) a second set of indices that (I) are each paired to an index within the first set of indices and (II) each correspond to port numbers of the network socket ports that facilitate transporting traffic across the network and whose values are calculated based at least in part on the offset of the paired index within the first set of indices, and then (3) forwarding at least one packet from the network device to a remote device using at least one of the network socket ports whose port numbers are identified in the bitmap.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
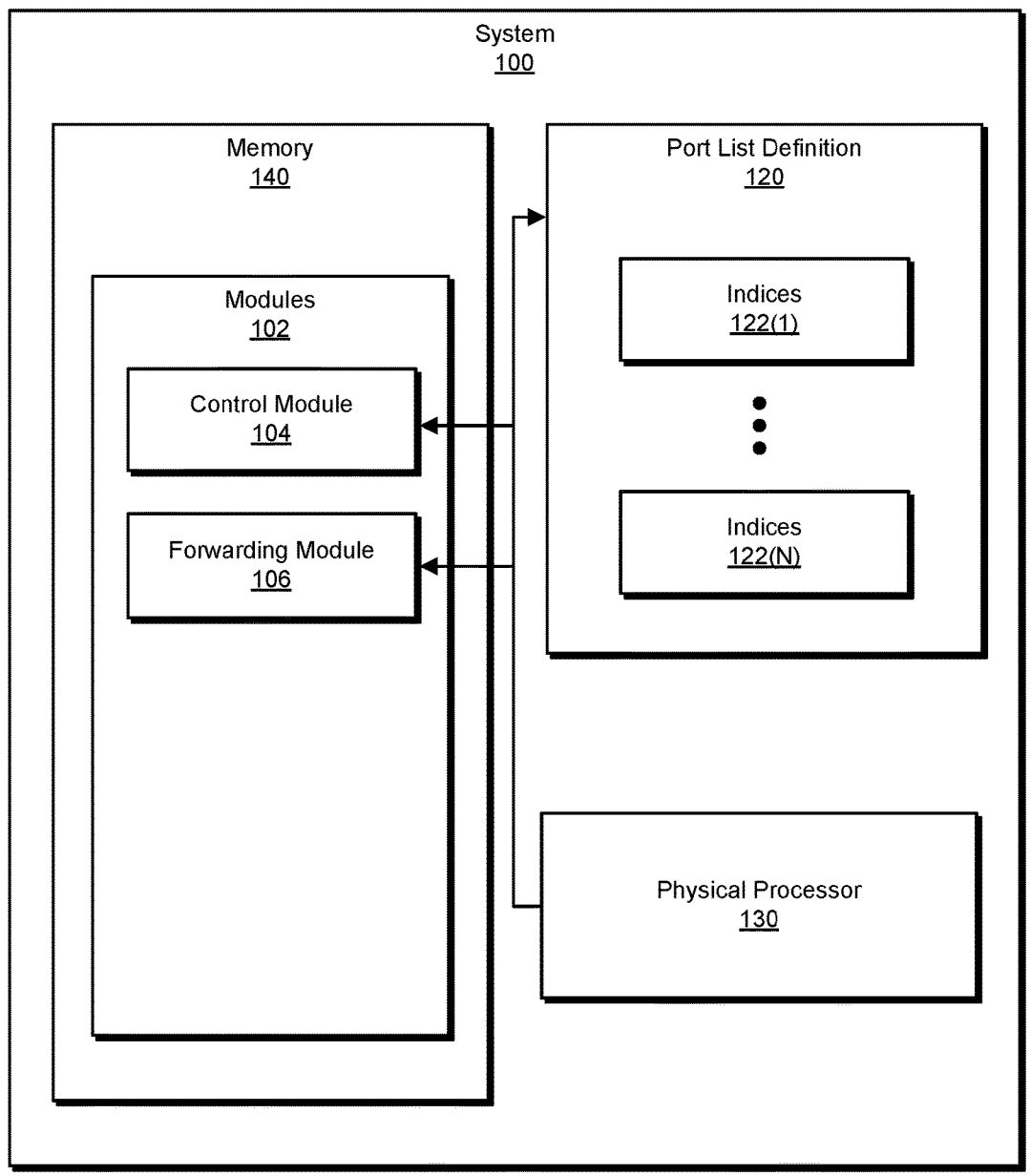
FIG. 1 is a block diagram of an exemplary system for compressing port list definitions for sparse port indices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for compressing port list definitions for sparse port indices. As will be explained in greater detail below, embodiments of the instant disclosure may provide a new compressed port list definition that requires less than 2000 bytes of space in the MIB of a network device. By compressing the port list definition in this way, these embodiments may ensure that MIB objects that rely on and/or implement the port list definition do not grow so long as to prevent certain SNMP and/or NMS tools from being able to access and/or fetch the values of those objects from the MIB.

Figure 2:
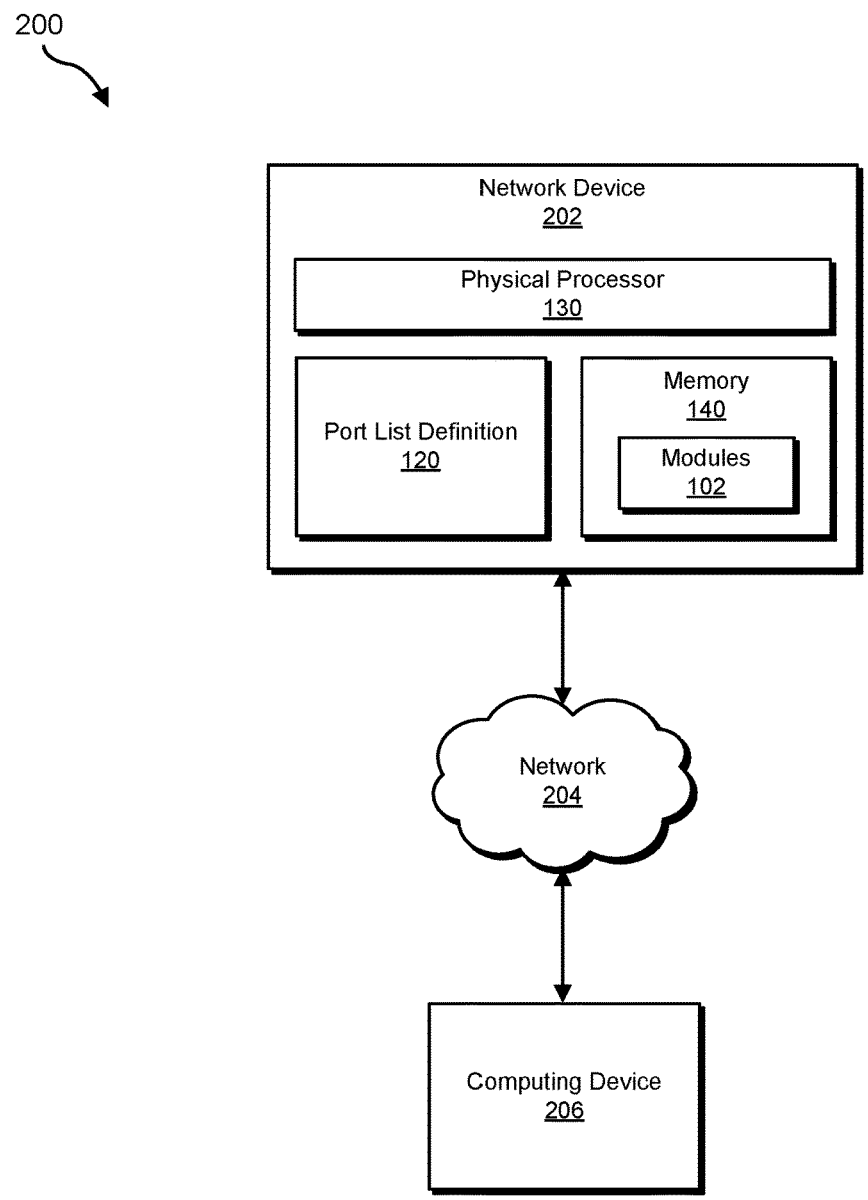
FIG. 2 is a block diagram of an exemplary system for compressing port list definitions for sparse port indices.

The following will provide, with reference to FIGS. 1 and 2, examples of apparatuses, systems, and components that facilitate compressing port list definitions for sparse list indices. Exemplary methods for compressing port list definitions for sparse port indices will be described in connection with FIG. 3. Exemplary port numbers will be described in connection with FIGS. 4 and 6. Exemplary compressed port lists will be described in connection with FIGS. 5 and 7. Finally, the discussion corresponding to FIG. 8 will provide numerous examples of systems that may include certain components shown in FIG. 1.

FIG. 1 is a block diagram of an exemplary system 100 for compressing port list definitions for sparse port indices. As illustrated in this figure, exemplary system 100 may include one or more modules 102 for performing one or more tasks. As will be explained in greater detail below, modules 102 may include a control module 104 and a forwarding module 106. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and computing device 206), the devices illustrated in FIG. 3, and/or the computing system illustrated in FIG. 8. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate compressing port lists with sparse port indices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, system 100 may further include, create, maintain, and/or provide a port list definition 120. In this example, port list definition 120 may represent a bitmap that includes indices 122(1)-(N). Indices 122(1)-(N) may correspond to port numbers and/or represent network socket ports used by a network device to transport traffic between devices. The term "network socket," as used herein, generally refers to any type or form of internal, logical, and/or virtual endpoint that facilitates sending and/or receiving data within a computing device.

Indices 122(1)-(N) may indicate and/or identify one or more network socket ports that are available to the network device. Indices 122(1)-(N) may also indicate and/or identify one or more network socket ports that are unavailable to the network device.

In some examples, port list definition 120 may be implemented by different SNMP MIB objects. For example, port list definition 120 may be implemented and/or used by "dot3adAggPortListPorts(IEEE8023-LAG-MIB)". Additionally or alternatively, port list definition 120 may be implemented and/or used by "dot1qTpGroupEgressPorts(Q-BRIDGE-MIB)".

Exemplary system 100 in FIG. 1 may be implemented in a variety of ways. For example, all or a portion of exemplary system 100 may represent portions of exemplary system 200 in FIG. 2. As shown in FIG. 2, system 200 may include network device 202 and computing device 206 in communication with one another via a network 204. In one example, all or a portion of the functionality of modules 102 may be performed by network device 202 and/or computing device 206. As will be described in greater detail below, one or more of modules 102 from FIG. 1 may, when executed by at least one processor of network device 202, enable network device 202 to compress port list definitions for sparse port indices.

Network device 202 generally represents any type or form of computing device capable of reading computer-executable instructions. In one example, network device 202 may include and/or represent a router (such as a Customer Edge (CE) router, Provider Edge (PE) router, hub router, spoke router, autonomous system boundary router, and/or area border router) that forwards traffic across a network. Additional examples of network device 202 include, without limitation, laptops, tablets, desktops, servers, switches, hubs, modems, bridges, repeaters, gateways, multiplexers, network adapters, network interfaces, network racks, chasses, storage devices, client devices, cellular phones, Personal Digital Assistants (PDAs), multimedia players, embedded systems, wearable devices (e.g., smart watches, smart glasses, etc.), gaming consoles, portions of one or more of the same, combinations or variations of one or more of the same, and/or any other suitable computing device. Although FIG. 2 illustrates network device 202 as being external to network 204, network device 202 may alternatively represent and/or be included in network 204.

Computing device 206 generally represents any type or form of computing device capable of reading computer-executable instructions. In one example, computing device 206 may include and/or represent a router (such as a CE router, PE router, hub router, spoke router, autonomous system boundary router, and/or area border router) that forwards traffic across a network. Additional examples of computing device 206 include, without limitation, laptops, tablets, desktops, servers, switches, hubs, modems, bridges, repeaters, gateways, multiplexers, network adapters, network interfaces, network racks, chasses, storage devices, client devices, cellular phones, PDAs, multimedia players, embedded systems, wearable devices, gaming consoles, portions of one or more of the same, combinations or variations of one or more of the same, and/or any other suitable computing device. Although FIG. 2 illustrates computing device 206 as being external to network 204, computing device 206 may alternatively represent and/or be included in network 204.

Network 204 generally represents any medium or architecture capable of facilitating communication or data transfer. In one example, network 204 may facilitate communication between computing network device 202 and computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, portions of one or more of the same, variations or combinations of one or more of the same, and/or any other suitable network.

Figure 3:
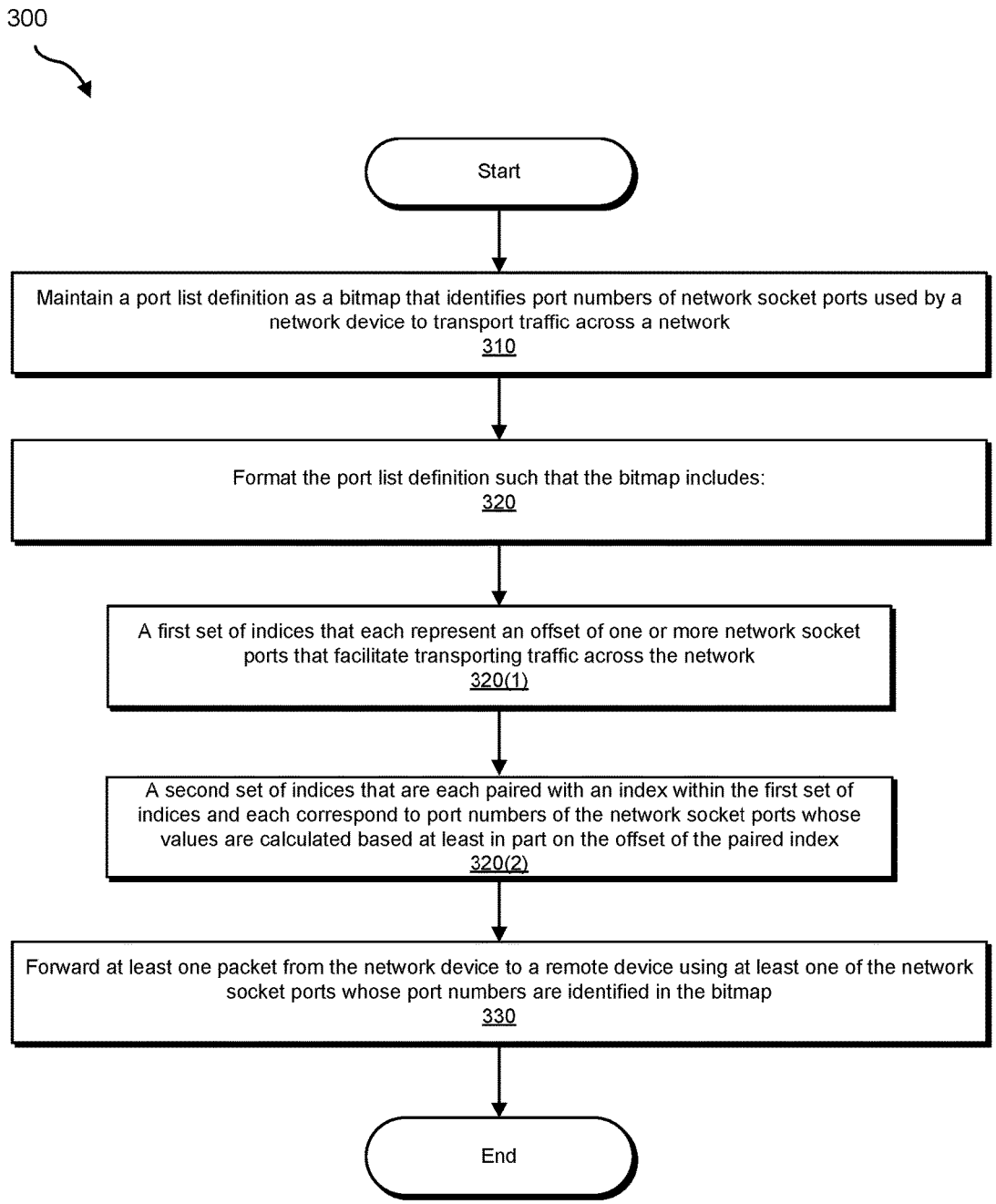
FIG. 3 is a flow diagram of an exemplary method for compressing port list definitions for sparse port indices.

FIG. 3 is a flow diagram of an example computer-implemented method 300 for facilitating controller-based multicast signaling. The steps shown in FIG. 3 may be performed by any suitable computer-executable code and/or computing system, including system 100 in FIG. 1, system 200 in FIG. 2, computing system 800 in FIG. 8, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may maintain a port list definition as a bitmap that identifies port numbers of network socket ports used by a network device to transport traffic across a network. For example, control module 104 may, as part of network device 202 in FIG. 2, maintain port list definition 120 as a bitmap. In this example, the bitmap may identify port numbers of network socket ports used by network device 202 to transport traffic across network 204.

In some examples, the network socket ports may be used by protocols of the transport layer of the Internet Protocol Suite and/or the Open Systems Interconnections (OSI). For example, the network socket ports may be used by the Transmission Control Protocol (TCP) and/or the User Datagram Protocol (UDP). Accordingly, such network socket ports may include and/or represent TCP ports and/or UDP ports. Additionally or alternatively, such network socket ports may include and/or represent so-called well-known ports, registered ports, dynamic ports, private ports, and/or ephemeral ports.

In some examples, the network socket ports may correspond to port numbers that range from 0 to 65,535. In one example, well-known ports may range from 0 to 1023. In this example, registered ports may range from 1024 to 49,151. Such port numbers may be official and/or unofficial.

The systems described herein may perform step 310 in a variety of different ways and/or contexts. In some examples, control module 104 may create port list definition 120 and then store port list definition 120 as a MIB object type. Additionally or alternatively, control module 104 may define a port list type that facilitates identifying the port numbers of the network socket ports used by the network device. In such examples, MIB objects may implement and/or use port list definition 120 to represent a port list. For example, the "dot3adAggPortListPorts(IEEE8023-LAG-MIB)" object may implement and/or use port list definition 120. Additionally or alternatively, the "dot1qTpGroupEgressPorts(Q-BRIDGE-MIB)" object may implement and/or use port list definition 120.

Returning to FIG. 3, at step 320 one or more of the systems described herein may format the port list definition. For example, at step 320(1) in FIG. 3, control module 104 may, as part of network device 202 in FIG. 2, format port list definition 120 such that the bitmap includes a first set of indices 122(1) that each represent an offset of one or more network sockets that facilitate transporting traffic across network 204. In addition, at step 320(2) in FIG. 3, control module 104 may format port list definition 120 such that the bitmap includes a second set of indices 122(N) that (1) are each paired with an index within the first set and (2) each correspond to port numbers of the network socket ports whose values are calculated based at least in part on the offset of the paired index.

The systems described herein may perform step 320 in a variety of different ways and/or contexts. In some examples, control module 104 may format port list definition 120 such that the bitmap identifies the port numbers of the network socket ports that are available to network device 202 and at least some of the port numbers of the network socket ports that are unavailable to network device 202. For example, port list definition 120 may include a series of "1s" and "0s". In one example, the "1s" and "0s" may be mixed and/or interspersed throughout port list definition 120. In this example, the "1s" may represent those network socket ports that are available to network device 202. In contrast, the "0s" may represent those network socket ports that are unavailable to network device 202. Accordingly, the bitmap may include and/or identify sparse port indices.

In some examples, control module 104 may arrange and/or organize various bits in a particular order to form indices 122(1)-(N). In one example, indices 122(1)-(N) may collectively identify the port numbers of the network socket ports used by network device 202. In this example, indices 122(1)-(N) may also collectively identify the port numbers of the network socket ports that are unavailable to network device 202.

In some examples, control module 104 may enable SNMP objects in the MIB on network device 202 to implement port list definition 120. In one example, control module 104 may compress port list definition 120 such that an SNMP tool and/or an NMS tool is able to access all the values of any SNMP objects that implement port list definition 120 in the MIB.

In some examples, control module 104 may add, to the bitmap, a record-size index that identifies a size of each record represented in the bitmap. In one example, control module 104 may place the record-size index at the beginning of the bitmap ahead of the first and second sets of indices. As a specific example, control module 104 may format port numbers 400 in FIG. 4 as compressed port list 500 in FIG. 5.

Figure 4:
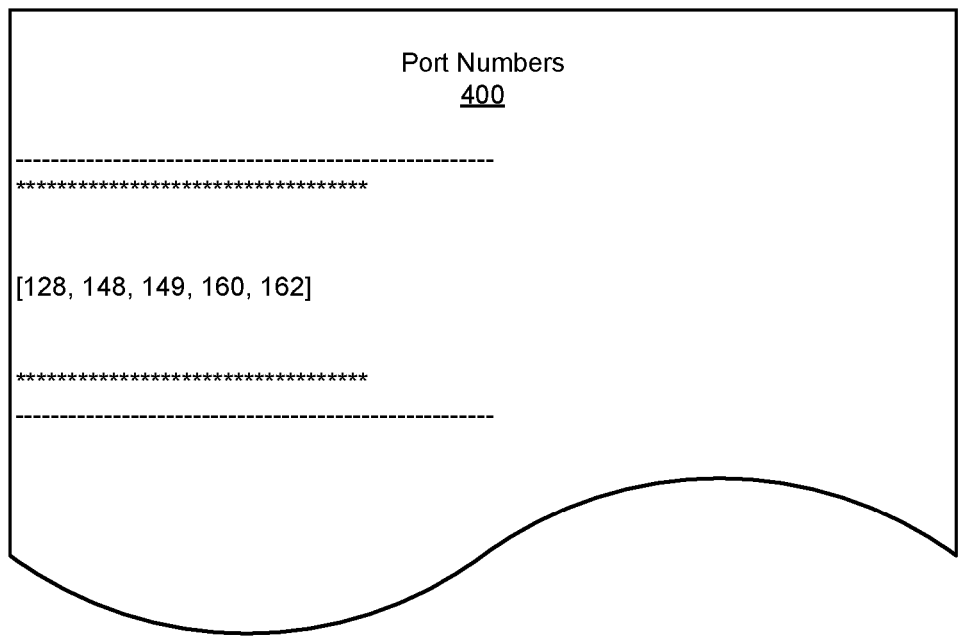
FIG. 4 is an illustration of exemplary port numbers of network socket ports used by a network device to transport traffic across a network.
Figure 5:
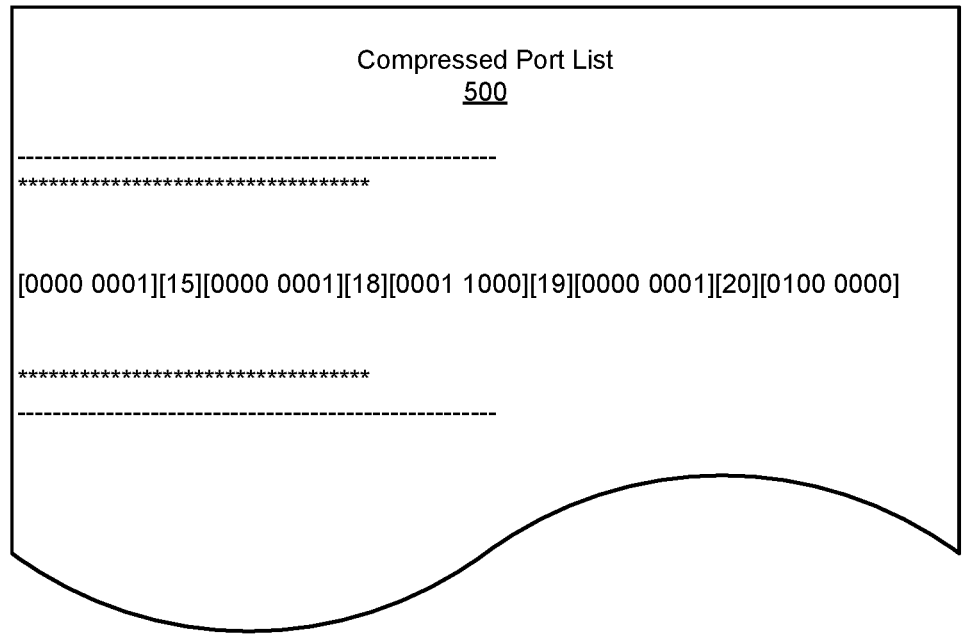
FIG. 5 is an illustration of an exemplary compressed port list that identifies the port numbers represented in FIG. 4.

As illustrated in FIG. 4, port numbers 400 may include "128", "148", "149", "160", and "162". These port numbers may correspond to and/or represent specific network socket ports. As illustrated in FIG. 5, compressed port list 500 may include various indices. In this example, the first index "[0000 0001]" (shown in binary format) may represent the size of the records represented in compressed port list 500. Since, in this example, "[0000 0001]" corresponds to and/or represents a "1", this index may indicate that the size of each record is 1 byte and/or 8 bits.

Continuing with this example, the remaining indices within compressed port list 500 may represent offsets and specific port numbers. For example, the second index "[15]" may represent an offset (shown in decimal format), which essentially serves as a multiplier and/or base for calculating the network socket ports represented in the following index. In this example, the third index "[0000 0001]" may represent specific port numbers that are paired to the "[15]" index and whose values are calculated based at least in part on the "15" offset.

More specifically, the position of each bit within the third index may correspond to a different value. For example, the bit positions in the third index may correspond to the following values: "[1234 5678]". Accordingly, in the third index, the only bit that is set may correspond to a value of "8".

In this example, the network socket ports to which the "15" offset corresponds may be calculated by multiplying the number of bits in the record size and then, for each bit that is set in the following index, adding a value that represents the set bit's position in that index to the product of the multiplication. In other words, the formula for calculating the corresponding port numbers may be represented as: offset*record size (in bits)+value of bit position in index paired to the offset=port number.

As a specific example, the offset represented in the second index of compressed port list 500 is 15, and the record size identified in the first index is 1 byte, which corresponds to 8 bits. Since, in the third index, the only set bit corresponds to a value of 8, the second and third indices of compressed port list 500 may represent the "128" port number from port numbers 400 in FIG. 4. In other words, compressed port list 500 may indicate that the port whose number is "128" is available to network device 202. However, compressed port list 500 may also indicate that the ports whose numbers are "121", "122", "123", "124", "125", "126", and "127" are unavailable to network device 202.

In this example, the "128" port number may be calculated by multiplying the 15 offset by 8 to generate a multiplication product of 120 and then adding 8 to that multiplication product. Accordingly, the formula may yield: 15 (offset)*8 (record size in bits)+8 (value of set bit position)=128 port number.

Continuing in this way, the fourth index "[18]" may represent an offset (shown in decimal format), which essentially serves as a multiplier and/or base for calculating the network socket ports represented in the fifth index. In this example, the fifth index "[00011000]" may represent specific port numbers that are paired to the "[18]" index and whose values are calculated based at least in part on the "18" offset. Since, in the third index, the set bits correspond to values of "4" and "5", the fourth and fifth indices of compressed port list 500 may represent the "148" and "149" port numbers from port numbers 400 in FIG. 4. In other words, compressed port list 500 may indicate that the ports whose numbers are "148" and "149" are available to network device 202. However, compressed port list 500 may also indicate that the ports whose numbers are "145", "146", "147", "150", "151", and "152" are unavailable to network device 202.

Similarly, the sixth index "[19]" may represent an offset (shown in decimal format), which essentially serves as a multiplier and/or base for calculating the network socket ports represented in the seventh index. In this example, the seventh index "[0000 0001]" may represent specific port numbers that are paired to the "[19]" index and whose values are calculated based at least in part on the "19" offset. Since, in the seventh index, the set bit corresponds to a value of "8", the sixth and seventh indices of compressed port list 500 may represent the "160" port number from port number 400 in FIG. 4. In other words, compressed port list 500 may indicate that the port whose number is "160" is available to network device 202. However, compressed port list 500 may also indicate that the ports whose numbers are "153", "154", "155", "156", "157", "158" and "159" are unavailable to network device 202.

Finally, the eighth index "[20]" may represent an offset (shown in decimal format), which essentially serves as a multiplier and/or base for calculating the network socket ports represented in the ninth index. In this example, the seventh index "[0100 0000]" may represent specific port numbers that are paired to the "[20]" index and whose values are calculated based at least in part on the "20" offset. Since, in the ninth index, the set bit corresponds to a value of "2", the eighth and ninth indices of compressed port list 500 may represent the "162" port number from port numbers 400 in FIG. 4. In other words, compressed port list 500 may indicate that the port whose number is "162" is available to network device 202. However, compressed port list 500 may also indicate that the ports whose numbers are "161", "163", "164", "165", "166", "167" and "168" are unavailable to network device 202.

Figure 6:
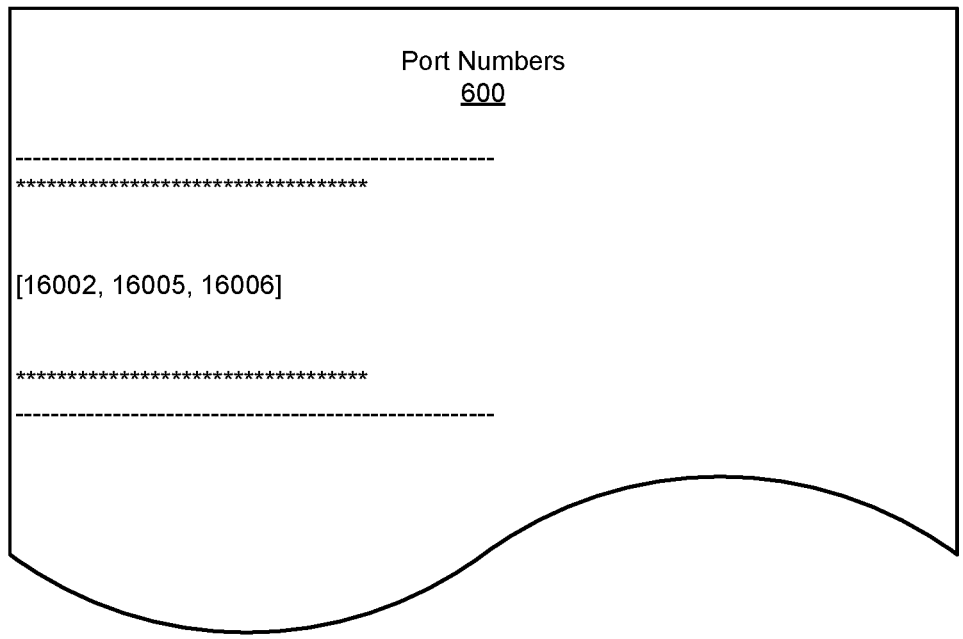
FIG. 6 is an illustration of exemplary port numbers of network socket ports used by a network device to transport traffic across a network.
Figure 7:
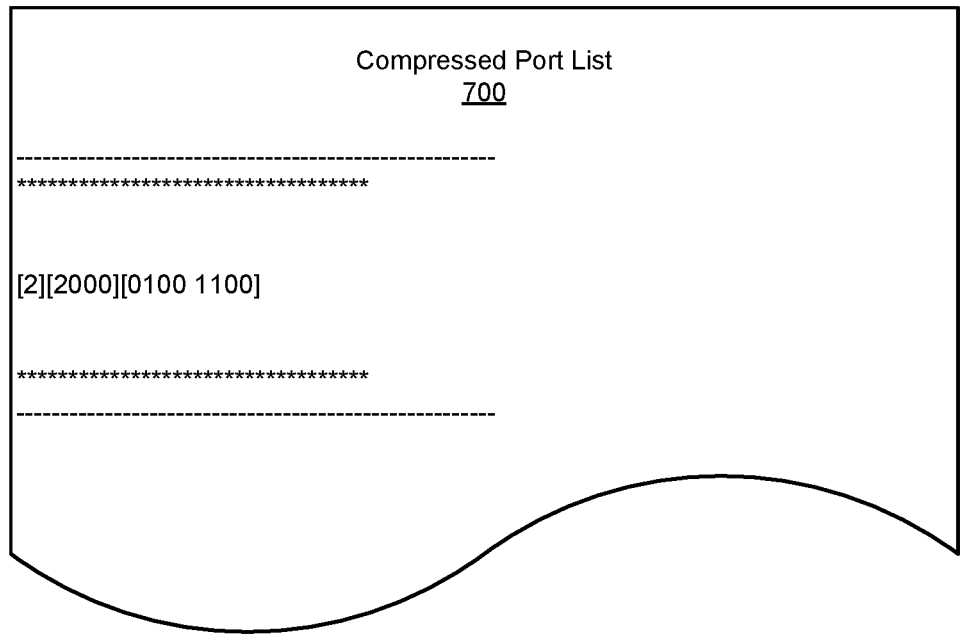
FIG. 7 is an illustration of an exemplary compressed port list that identifies the port numbers represented in FIG. 6.

As another specific example, control module 104 may format port numbers 600 in FIG. 6 as compressed port list 700 in FIG. 7. As illustrated in FIG. 6, port numbers 600 may include "16002", "16005", and "16006". These port numbers may correspond to and/or represent specific network socket ports. As illustrated in FIG. 7, compressed port list 700 may include various indices. In this example, the first index "[2]" (shown in decimal format) may represent the size of the records represented in compressed port list 700. Since, in this example, the first index corresponds to and/or represents a 2 value, this index may indicate that the size of each record is 2 bytes and/or 16 bits.

Continuing with this example, the second index "[2000]" may represent an offset (shown in decimal format), which essentially serves as a multiplier and/or base for calculating the network socket ports represented in the following index. In this example, the third index "[0100 1100]" may represent specific port numbers that are paired to the "[2000]" index and whose values are calculated based at least in part on the "2000" offset.

In this example, the offset represented in the second index of compressed port list 700 is 2000, and the record size identified in the first index is 2 bytes, which corresponds to 16 bits. Since, in the third index, the set bits correspond to values of "2", "5", and "6", the second and third indices of compressed port list 700 may represent the "16002", "16005", and "16006" port numbers from port numbers 600 in FIG. 6. In other words, compressed port list 700 may indicate that the ports whose numbers are "16002", "16005", and "16006" are available to network device 202. However, compressed port list 700 may also indicate that the ports whose numbers are "16001", "16003", "16004", "16007", and "16008" are unavailable to network device 202.

Returning to FIG. 3, at step 330 one or more of the systems described herein may forward at least one packet from the network device to a remote device using at least one of the network socket ports whose port numbers are identified in the bitmap. For example, forwarding module 106 may, as part of network device 202 in FIG. 2, forward at least one packet to computing device 206 via network 204. In this example, the packet may include any type or form of data, message, and/or communication.

The systems described herein may perform step 330 in a variety of different ways and/or contexts. In some examples, forwarding module 106 may use one of the ports whose port numbers are identified in port list definition 120 to send the packet via the transport layer to computing device 206. Additionally or alternatively, forwarding module 106 may use one of the ports whose port numbers are identified in compressed port list 500 or compressed port list 600 to send the packet via the transport layer to computing device 206. For example, forwarding module 106 may use one of port numbers "128", "148", "149", "160", "162", "16002", "16005" and "16006" to send the packet via the transport layer to computing device 206.

Figure 8:
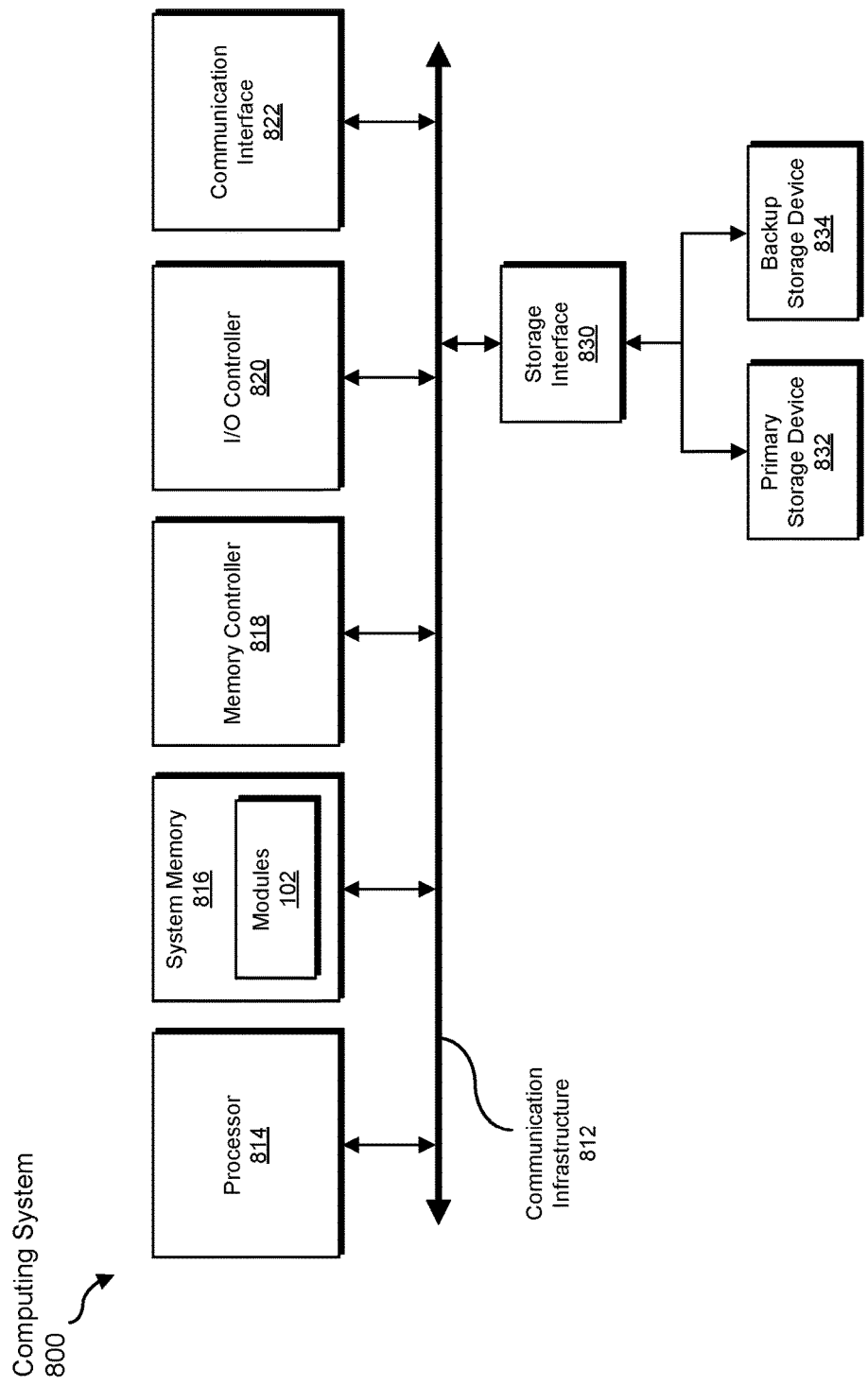
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    maintaining a port list definition as a bitmap that identifies port numbers of network socket ports used by a network device to transport traffic across a network;
    formatting the port list definition such that the bitmap includes:
        a record-size index that identifies a size of each record represented in the bitmap;
        a first set of indices that each represent an offset of one or more network socket ports that facilitate transporting traffic across the network; and
        a second set of indices that:
            are each paired to an index within the first set of indices; and
            each correspond to port numbers of the network socket ports that facilitate transporting traffic across the network and whose values are calculated based at least in part on the offset of the paired index within the first set of indices;
    formatting the port list definition such that the bitmap identifies the port numbers of the network socket ports used by the network device by:
        calculating a first multiplication product by multiplying the offset represented by the index within the first set of indices by the size of each record identified in the record-size index;
        calculating a second multiplication product by multiplying the first multiplication product by a byte size used by the network device; and
        for each bit that is set in the index within the second set of indices that is paired to the index within the first set of indices, adding a value that represents the set bit's position in the paired index within the second set of indices to the second multiplication product to produce a sum that represents a port number of a network socket port that is used by the network device; and
    forwarding at least one packet from the network device to a remote device using at least one of the network socket ports whose port numbers are identified in the bitmap.

2. The method of claim 1, wherein the network socket ports that facilitate transporting traffic across the network comprise at least one of:
    network socket ports used by the Transport Layer of the Internet Protocol Suite;
    Transmission Control Protocol (TCP) ports; and
    User Datagram Protocol (UDP) ports.

3. The method of claim 1, wherein the bitmap also identifies port numbers of network socket ports that are unavailable to the network device for transporting traffic across the network.

4. The method of claim 3, wherein the bitmap comprises a series of bits that:
    form the first and second sets of indices;
    collectively identify the port numbers of the network socket ports used by the network device; and
    collectively identify the port numbers of the network socket ports that are unavailable to the network device.

5. The method of claim 1, further comprising enabling one or more Simple Network Management Protocol (SNMP) objects stored in a Management Information Base (MIB) to implement the port list definition.

6. The method of claim 5, wherein formatting the port list definition comprises compressing the port list definition such that a Network Management System (NMS) tool is able to access values of the SNMP objects that implement the port list definition in the MIB.

7. The method of claim 1, wherein adding the record-size index to the bitmap comprises placing the record-size index at the beginning of the bitmap ahead of the first and second sets of indices.

8. The method of claim 1, wherein maintaining the port list definition as the bitmap comprises defining a port list type that facilitates identifying the port numbers of the network socket ports used by the network device.

9. A system comprising:
    a control module, stored in memory, that:
        maintains a port list definition as a bitmap that identifies port numbers of network socket ports used by a network device to transport traffic across a network;
        formats the port list definition such that the bitmap includes:
            a record-size index that identifies a size of each record represented in the bitmap;
            a first set of indices that each represent an offset of one or more network socket ports that facilitate transporting traffic across the network; and
            a second set of indices that:
                are each paired to an index within the first set of indices; and
                each correspond to port numbers of the network socket ports that facilitate transporting traffic across the network and whose values are calculated based at least in part on the offset of the paired index within the first set of indices; and
        formats the port list definition such that the bitmap identifies the port numbers of the network socket ports used by the network device by:
            calculating a first multiplication product by multiplying the offset represented by the index within the first set of indices by the size of each record identified in the record-size index;

calculating a second multiplication product by multiplying the first multiplication product by a byte size used by the network device; and for each bit that is set in the index within the second set of indices that is paired to the index within the first set of indices, adding a value that represents the set bit's position in the paired index within the second set of indices to the second multiplication product to produce a sum that represents a port number of a network socket port that is used by the network device;

a forwarding module, stored in memory, that forwards at least one packet from the network device to a remote device using at least one of the network socket ports whose port numbers are identified in the bitmap; and at least one physical processor configured to execute the control module and the forwarding module.

10. The system of claim 9, wherein the network socket ports that facilitate transporting traffic across the network comprise at least one of:

network socket ports used by the Transport Layer of the Internet Protocol Suite;

Transmission Control Protocol (TCP) ports; and

User Datagram Protocol (UDP) ports.

11. The system of claim 9, wherein the bitmap also identifies port numbers of network socket ports that are unavailable to the network device for transporting traffic across the network.

12. The system of claim 11, wherein the bitmap comprises a series of bits that:

form the first and second sets of indices;

collectively identify the port numbers of the network socket ports used by the network device; and collectively identify the port numbers of the network socket ports that are unavailable to the network device.

13. The system of claim 9, wherein the control module enables one or more Simple Network Management Protocol (SNMP) objects stored in a Management Information Base (MIB) to implement the port list definition.

14. The system of claim 13, wherein the control module compresses the port list definition such that a Network Management System (NMS) tool is able to access values of the SNMP objects that implement the port list definition in the MIB.

15. The system of claim 9, wherein the control module places the record-size index at the beginning of the bitmap ahead of the first and second sets of indices.

16. An apparatus comprising:

a storage device that stores a port list definition as a bitmap that identifies port numbers of network socket ports used by a network device to transport traffic across a network; and a physical processor that is communicatively coupled to the storage device, wherein the physical processor:

formats the port list definition such that the bitmap includes:

a record-size index that identifies a size of each record represented in the bitmap;

a first set of indices that each represent an offset of one or more network socket ports that facilitate transporting traffic across the network; and a second set of indices that:

are each paired to an index within the first set of indices; and each correspond to port numbers of the network socket ports that facilitate transporting traffic across the network and whose values are calculated based at least in part on the offset of the paired index within the first set of indices;

formats the port list definition such that the bitmap identifies the port numbers of the network socket ports used by the network device by:

calculating a first multiplication product by multiplying the offset represented by the index within the first set of indices by the size of each record identified in the record-size index;

calculating a second multiplication product by multiplying the first multiplication product by a byte size used by the network device; and for each bit that is set in the index within the second set of indices that is paired to the index within the first set of indices, adding a value that represents the set bit's position in the paired index within the second set of indices to the second multiplication product to produce a sum that represents a port number of a network socket port that is used by the network device; and forwards at least one packet from the network device to a remote device using at least one of the network socket ports whose port numbers are identified in the bitmap.

* * * * *